US005666500A

United States Patent [19]
Roberson

[11] Patent Number: 5,666,500
[45] Date of Patent: Sep. 9, 1997

[54] WORKSTATION USER INTERFACE FOR USE IN CONJUNCTION WITH A HOST DATA PROCESSING SYSTEM

[75] Inventor: Kenneth Wayne Roberson, Irving, Tex.

[73] Assignee: International Business Machines Corporation, Armonk, N.Y.

[21] Appl. No.: 996,446

[22] Filed: Dec. 24, 1992

[51] Int. Cl.$^6$ .................................................. G06F 3/00
[52] U.S. Cl. .................................................... 345/348
[58] Field of Search ................................ 395/159, 161, 395/348

[56] References Cited

U.S. PATENT DOCUMENTS

| | | | |
|---|---|---|---|
| 4,866,638 | 9/1989 | Cosentino et al. | 395/159 |
| 5,214,756 | 5/1993 | Franklin et al. | 395/159 |
| 5,228,137 | 7/1993 | Kleinerman et al. | 395/500 |
| 5,335,320 | 8/1994 | Iwata et al. | 395/155 |
| 5,367,626 | 11/1994 | Morioka et al. | 395/159 |
| 5,394,522 | 2/1995 | Sanchez-Frank et al. | 395/159 |

OTHER PUBLICATIONS

Meyer, "Face to Face With Your Mainframe", MacUser (Feb. 1990), pp. 276, 277, 279, 281, and 282.
Gerber et al., "Future Soft Engineering Inc Dynacomm Asynchronous Edition Version 3.0", PC Week, vol. 7 No. 32 (Aug. 13, 1990), pp. 78–79.
Scannell, "Capella's Smart Screen Extends Windows to SAA", InfoWorld, vol. 12 No. 14, (Apr. 2, 1990), p. 31 Abstract Only.
Snell, "Automate Mainframe Links With Windows", Datamation, vol. 37 No. 25 (Dec. 15, 1991), pp. 33–35.
Berlind, "Tool Offers Transparent PC-to-Host Links", PC Week, vol. 9 No. 16 (Apr. 20, 1992), pp. 91–92.
Prosise, "Replace Windows 3.0 DOS Icons", PC-Computing, vol. 4 No. 2 (Feb. 1991), pp. 180–185.
Brown, "Prograph", Patricia Seybold's Office Computing Report, vol. 13 No. 2 (Feb. 1990), pp. 10–12.
Hirakawa et al., "A Framework for Construction of Icon Systems", 1988 IEEE Workshop On Visual Languages (1988), pp. 70–77.
Rosenbaum, "QuicKeys #2.1.2", Computer Shopper, vol. 12 No. 10 (Oct. 1992), pp. 611–612.
Cranford, "Using SmartIcons in 1-2-3", Lotus, vol. 8 No. 9 (Sep. 1992), pp. 14–15.
Cranford, "Just a Click Away", Lotus, vol. 8 No. 8 (Aug. 1992), pp. 17–19.
Trivette, "Quick Menu III: Making DOS Easier", PC Sources, vol. 3 No. 8 (Aug. 1992), p. 417.

Primary Examiner—Heather R. Herndon
Assistant Examiner—Joseph R. Burwell
Attorney, Agent, or Firm—Geoffrey A. Mantooth

[57] ABSTRACT

A user interface is provided for a workstation when the workstation is using a host data processing system. The interface provides a windows type of graphical interface on the workstation when using a host program. The interface allows point-and-go access to host program functions with a mouse. Icons represent desired host functions. The interface provides audio notification of incoming mail, allows files to be uploaded and downloaded between the workstation to the host, allows a user to program an icon and executes host macros.

8 Claims, 16 Drawing Sheets

1

WORKSTATION USER INTERFACE FOR USE IN CONJUNCTION WITH A HOST DATA PROCESSING SYSTEM

FIELD OF THE INVENTION

The present invention relates to workstation user interfaces for use in conjunction with host data processing systems.

BACKGROUND OF THE INVENTION

Mainframe computers have traditionally utilized non-programmable terminals (NPT) as user interfaces. For many years, these NPT's were little more than a cathode ray tube or screen and a keyboard. Later some intelligence was added to these terminals by adding a microprocessor and a memory.

Over the years, there has been much software developed for mainframe computers. This software is typically built with interfaces for NPT's. One such software product is Office Vision/MVS (OV/MVS), an IBM product. OV/MVS provides a paperless office system where a user can do things such as send notes, write documents and keep address books. Much of this software has powerful features, making it desirable to use.

With the advent of personal computers such as workstations, the number of computer users has greatly expanded. Along with this there has developed a demand for software that is more user friendly. One successful product is Microsoft Windows™, which uses graphical representations, such as icons, to interface with the user. In addition, each program may be represented as a window on the screen. Plural windows may be displayed on the screen.

In the prior art, users of workstations can access host programs such as OV/MVS through host screens with a program known as CMMouse. The host generates the screens, which are displayed on the workstation. The host screens are designed for NPT's, not for workstations and their window type of interfaces. This lack of consistency makes it difficult for a user skilled in a window type of interface to utilize host software such as OV/MVS.

It is desirable to allow a workstation user to access host software, such as OV/MVS, through a windows type of interface. In this regard, the user should be able to provide mail status or mail notification information, create iconic interfaces for host programs appearing on the workstation and transfer files between the workstation and the host.

SUMMARY OF THE INVENTION

It is an object of the present invention to provide a windows type of user interface for workstations when used in conjunction with a host data processing system.

The present invention provides a user interface for a workstation when the workstation is using a host data processing system. The interface provides a windows type of graphical interface on the workstation for the use of the host program. The interface allows point-and-go access to the host program functions with the mouse. Icons represent desired host functions.

In one aspect, the invention notifies a user of an interface device of the arrival of mail on a data processing system. It is determined if mail has arrived for the user on a data processing system and if so then musical notes in the form of a distinctive melody are played on the interface device.

In another aspect of the present invention, one or more selected files are transferred between a workstation and a host computer. A file transfer icon is provided on the workstation and it is determined when the icon is selected by a user. The workstation advises a host that the file transfer is to be made and the selected files are transferred between the host and the workstation.

In still another aspect of the present invention, an icon can be programmed for display on a work system that is in communication with the host data processing system. The host function that is to be associated with an icon is determined. Then, parameters that are enabling for the execution of the function by the host are automatically specified. An icon is associated with the function.

BRIEF DESCRIPTION OF THE DRAWING

FIGS. 5a and 5b shows a flow chart for uploading files from the workstation to the host. FIGS. 6a and 6b shows a flow chart for downloading files from the host to the workstation.

DESCRIPTION OF THE PREFERRED EMBODIMENT

Figure 1:
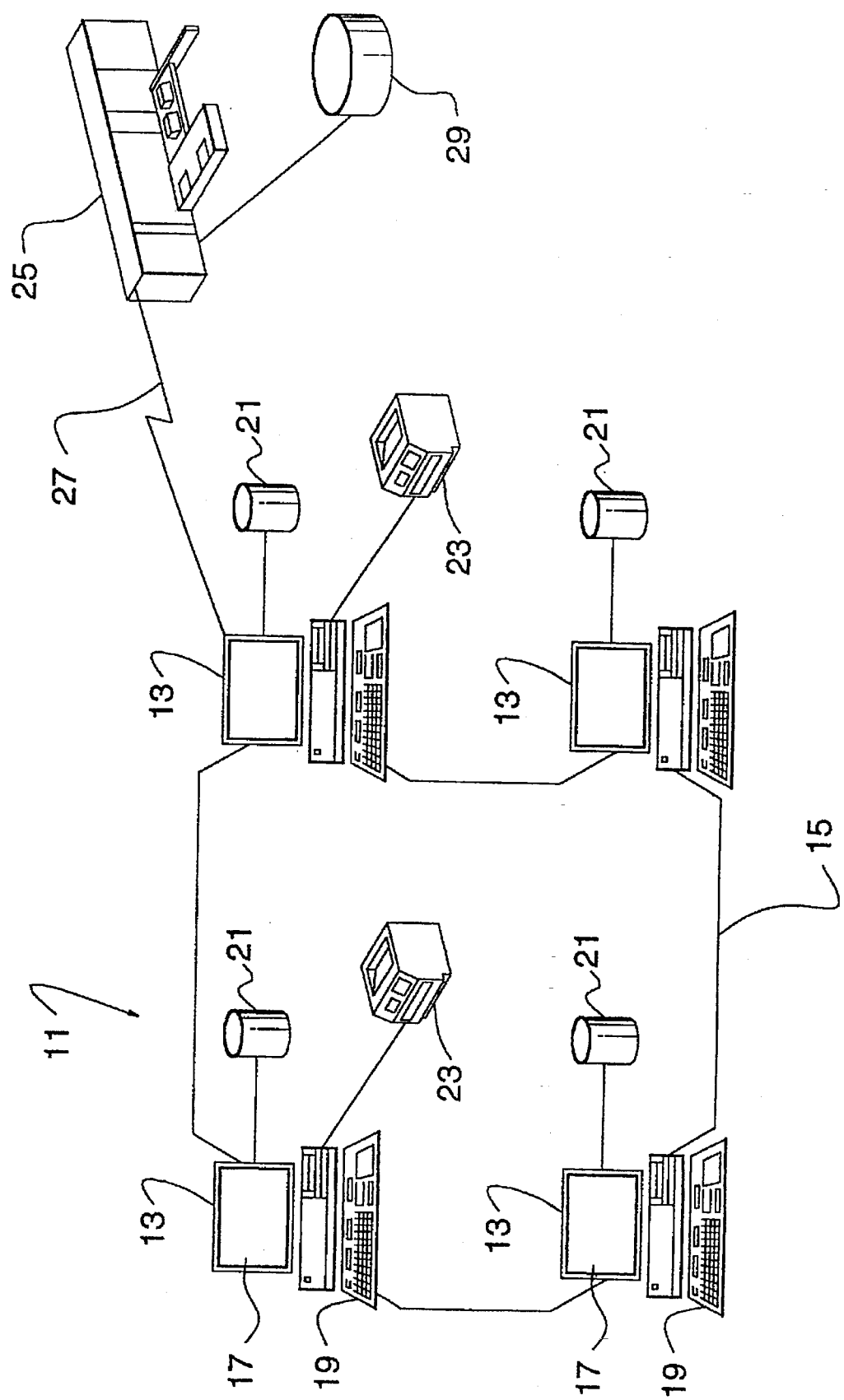
FIG. 1 is a schematic diagram of a data processing system on which the present invention can be practiced.

In FIG. 1, there is shown a schematic diagram of a data processing system 11 upon which the present invention can be practiced. The data processing system 11 includes plural individual computers or workstations 13 which are connected together in a local area network (LAN) 15. Each workstation 13 includes a user interface, which has a display screen 17 and a keyboard 19. Each workstation 13 may also be coupled to a storage device 21 and to a printer or output device 23. One or more of such storage devices 21 may be utilized, in accordance with the present invention, to store applications or resource objects which may be periodically accessed by any user within the data processing system 11.

The data processing system 11 may also include a mainframe or host computer 25 that is coupled to one of the workstations by a communication link 27. The host computer 25 may also be coupled to a storage device 29 which may serve as a remote storage for the computers.

In FIGS. 4a–8 are shown flow charts. In the flow charts, the following graphical conventions are observed: a rectangle for either a process, function or screen display, a subrectangle or diamond for a decision and a circle for a connector in exiting to or entering from another part of the flow chart. These conventions are well understood by programmers skilled in the art of user interfaces and the flow charts are sufficient to enable a programmer skilled in the art to write code in any suitable computer programming language, such as BASIC, PASCAL or C for a computer such as the IBM Personal System / 2 (PS/2) family of computers which supports these languages.

Figure 2:
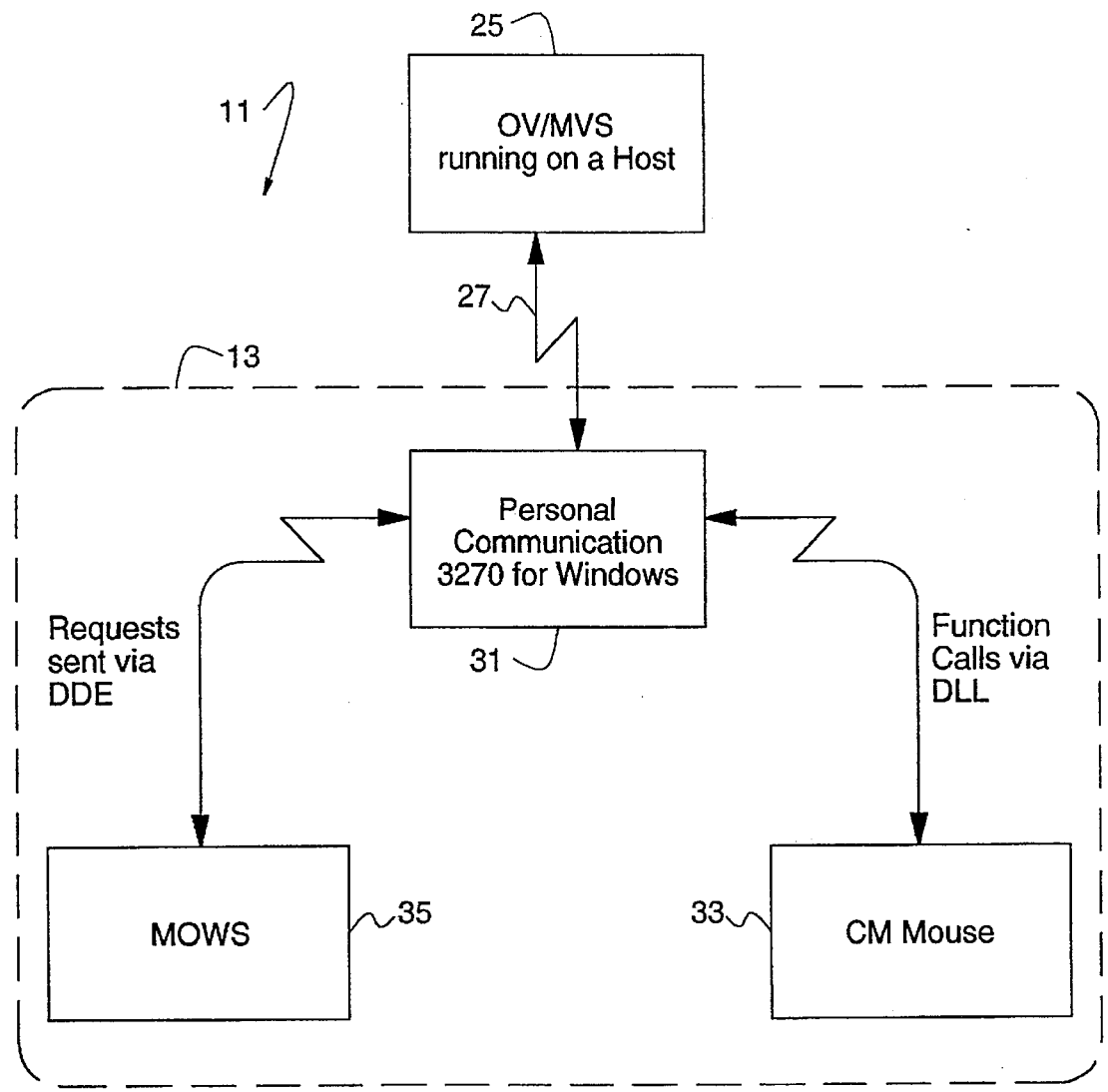
FIG. 2 is a schematic block diagram showing the interface of the present invention in relation to the workstation and host computer.

In FIG. 2, there is shown another representation of the data processing system 11. The host computer 25 is executing a software program. The specific software program being executed in the preferred embodiment is OV/MVS (Office Vision/Multiple Virtual System), a conventional and commercially available product. The workstation 13 communicates with the host 25 by the communications link 27. The workstation is executing a windows type of graphical interface program such as version 3. X of Windows™. The user is accessing the host program through the windows type of interface. An emulator 31 allows the workstation 13 to communicate with the mainframe 25 by emulating an NPT. The particular emulator 31 used in the preferred embodiment is Personal Communications/3270 V2 w/CSD 2 or V3, a conventional and commercially available product.

In the prior art, there exists a program called CMMouse 33, which is a utility that allows the use of a mouse when using a program such as OV/MVS on a host computer. Screens or displays generated by the host 25 are produced on the screen 17. Icons are not used in the user interface on the workstation. Thus, the user who is executing a windows type of interface and who enters OV/MVS is confronted with a different and non-windows type of interface. CMMouse 33 utilizes a conventional interface called Enhanced High Level Language Application Programming Interface (EHLLAPI). CMMouse 33 communicates with the emulator 31 with function calls via a Dynamic Link Library (DLL).

A problem with the CMMouse arrangement is that the DLL acts as a middleman and takes away from the user interface. The windows type of user interface is not a multitasking environment. That is, only one task or job at a time can be performed. Once CMMouse hands a thread, or slice of execution time, to the DLL, no other job can be performed because the DLL monopolizes the execution time of the workstation. As a result, performance of the workstation is degraded. This is particularly noticeable with some of the earlier microprocessors such as the 80286 and 80386 microprocessors.

On the other hand, the present invention 35 uses a communications protocol known as Dynamic Data Exchange (DDE) to communicate with the emulator 31. When a message is sent to the emulator using the DDE, after the message is sent, the DDE gives up control to the windows type of user interface. This allows other tasks to be performed.

In the preferred embodiment, the interface program 35 of the present invention is referred to as MOWS (for MVS office workstation support).

Figure 3:
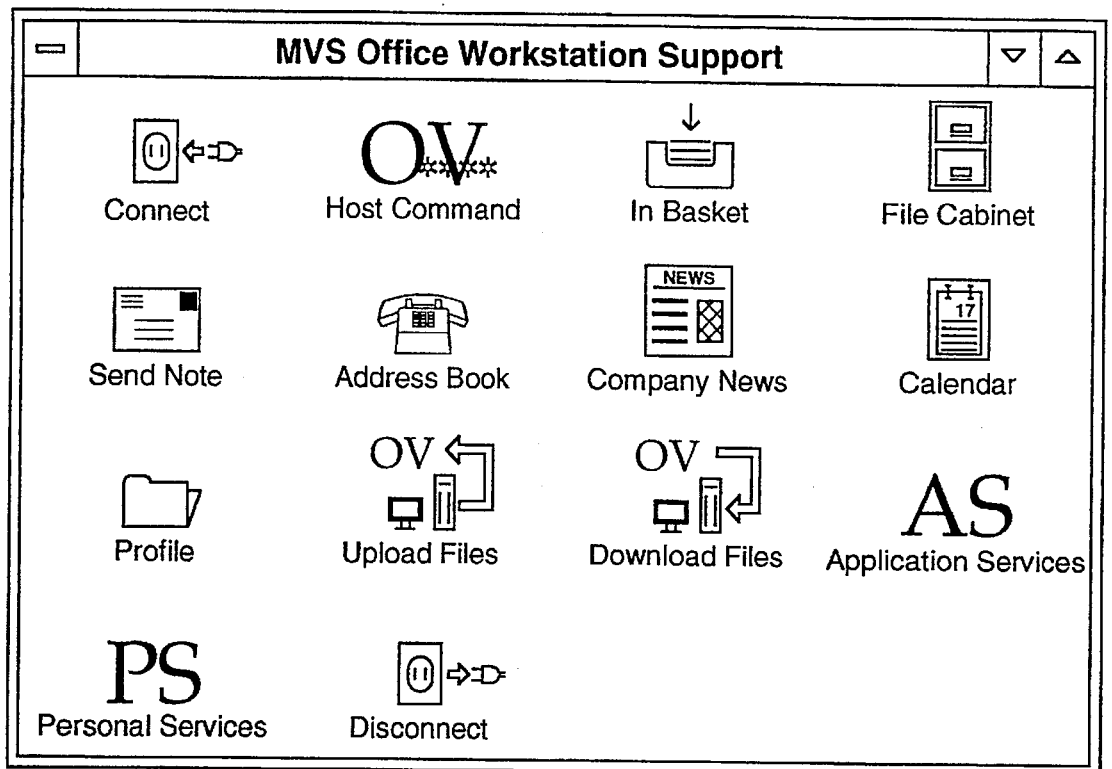
FIG. 3 is a diagram showing the main window for the interface of the present invention, in accordance with a preferred embodiment.
Figure 4A:
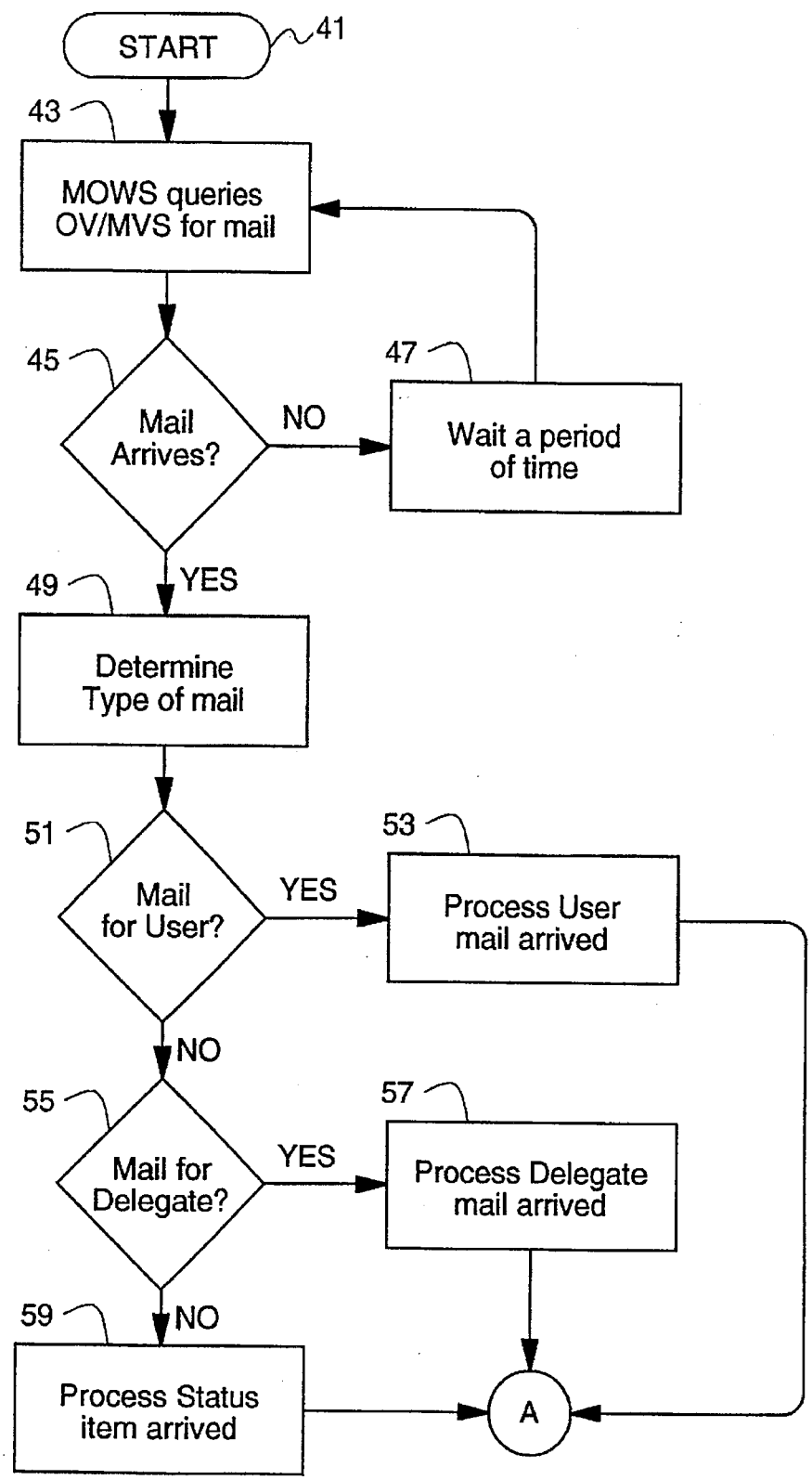
FIGS. 4a and 4b are flow charts showing the mail processing aspect.
Figure 4B:
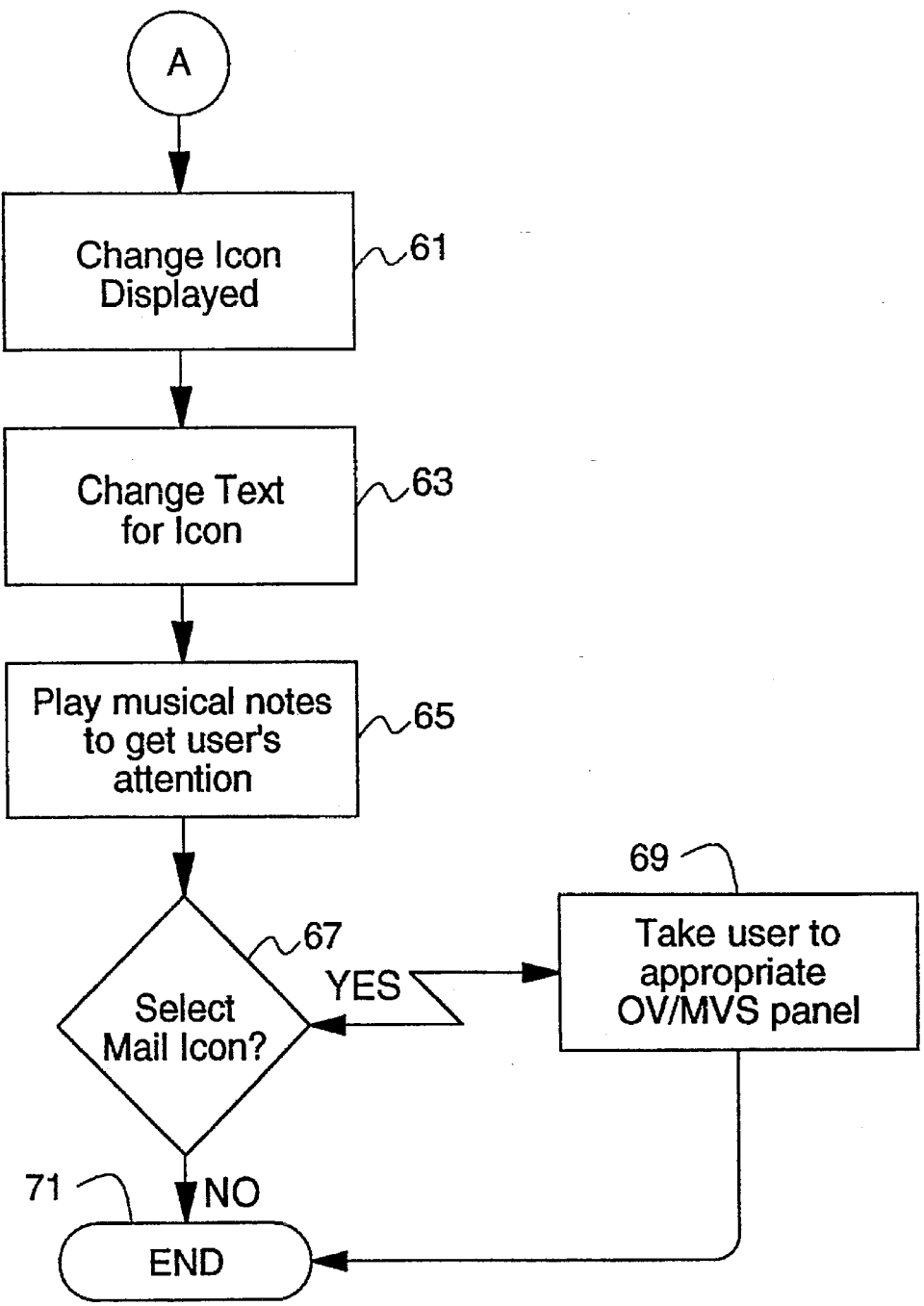

In FIG. 3, there is shown the mail window 37 for MOWS. When a workstation user turns on the workstation, the windows type of graphical interface can be entered. MOWS is represented as an icon and may be located in the Program Manager window near the Main and Accessory icons. To enter the MOWS program, the user selects the MOWS icon, for example, by double clicking their cursor on the icon. This action will bring up the window 37 of FIG. 3.

As shown in FIG. 3, the MOWS program provides a window type of graphical interface for the host OV/MVS program. Thus, the invention provides Point-and-Go access with a mouse. Icons are used to represent desired host functions. The icons can be defined to execute a single predefined function, display a user created list of host operations or present the user with an input area for the user to enter any desired host command. The icons and selectable functions are completely controlled by the user.

To log on to the OV/MVS host program, the user selects the "Connect" icon. Likewise, to log off of the OV/MVS program, the user selects the "Disconnect" icon. If the user selects the "Host Command" icon, the program will ask the user what the user wants to do. If the user selects either the "In Basket" icon, the "File Cabinet" icon, the "Send Note" icon, the "Address Book" icon or the "Company News" icon, a specific OV/MVS command will be executed. Selection of the "In Basket" icon will take the user to any mail for the user. The mail is stored on the host. Selection of the "File Cabinet" icon will take the user to items, such as files, stored on the host. Selection of the "Send Note" icon will take the user to that portion of the host program that allows the user to send mail to another user. Selection of the "Address Book" icon will take the user to that portion of the host program where the user can look up information such as names, addresses and phone numbers. Selection of the "Company News" icon will take the user to a corporation wide bulletin board located on the host. Selection of the "Calendar" icon provides a list of options that the user can choose from. For example, the user can add an appointment, delete an appointment or review a list of appointments. After an item or appointment has been selected by the user, the user will be taken to that item on the host. Selection of the "Profile" icon allows the user to provide a user identification. The "Upload Files" and "Download Files" icon will be discussed below, in conjunction with FIGS. 5 and 6. The "Application Services" and "Personal Services" icons provide capabilities similar to the "Calendar" icon in that the user can select from a list of options.

MOWS has several aspects, which will be discussed in turn. One aspect of MOWS involves mail processing. The method of processing mail will described with reference to FIGS. 4a and 4b. The method is started, step 41, whenever the user accesses the host through MOWS 31 by selecting the "Connect" icon from the main window 37 of FIG. 3. In step 43, MOWS 31 queries the host program, OV/MVS, for mail. This is done over the communications link 27. The host receives mail from various users and stores the mail. In step 45, the method determines if any mail has arrived for the user at the host. If the result of step 45 is NO, the method waits for a predetermined period of time, step 47, before repeating step 43. If the result of step 45 is YES, then the type of mail is determined, step 49. In step 51, the method determines if the mail is for the user. If YES, then the "user mail arrived" flag is processed and set, step 53. The method then continues on to step 61. If the result of step 51 is NO, then the method determines if the mail is for a delegate of the user, such as a secretary, step 55. If YES, then the "delegate mail arrived" flag is processed and set, step 57. The method then proceeds to step 61. If the result of step 55 is NO, then a "status item arrived" flag is processed and set, step 59. The method then proceeds to step 61.

In step 61, the mail icon on the screen is changed. The icon can be, for example, an envelope. The icon is displayed at the bottom of the screen 17, along with any other icons of running programs. Changing the icon may involve highlighting or changing the color of the icon. Alternatively, an "X" could be located inside of the envelope to indicate that no mail has arrived. Changing the icon would then involve removal of the "X" from the inside of the envelope to indicate that mail has arrived. In step 63, the text for the icon is changed. For example, this could involve changing "No mail" that is displayed beneath the icon to "Mail has arrived" if the "user mail arrived" flag was set in step 53. Alternatively, the text, "Delegate mail has arrived" is displayed if the "delegate mail arrived" flag was set in step 57 or an error message is displayed if the "status item arrived" flag was set in step 59. Thus, the text can be changed to provide an indication of the type of mail that has arrived.

In step 65, musical notes in the form of a melody are played to get the user's attention that mail has arrived. A speaker located inside of the workstation 13 generates the music. The melody that is played to indicate the arrival of mail is distinctive from other audio alarms or indicators that may be provided to the user. For example, many operations performed by the user result in an audio beep. The mail arrived melody is distinctive from this type of audio beep. The melody that is played is several seconds in duration, which duration is long enough to provide a distinctive alarm that the user associates with the arrival of mail, but not so long as to become annoying after many repetitions of the alarm.

In step 67, the method determines if the user, after having been notified that mail has arrived, selects the mail icon. If the result of step 67 is YES, then the method displays to the user the appropriate panel, or screen display, with the mail contents, step 69. The panel is generated by the host program OV/MVS. Step 69 also changes the status of the mail icon. After step 69, the method ends, step 71. If the result of step 67 is NO, then the status of the icon is not changed. The method ends, step, 71, whenever the user selects the "Disconnect" icon from the window 37 of FIG. 3.

Figure 5A:
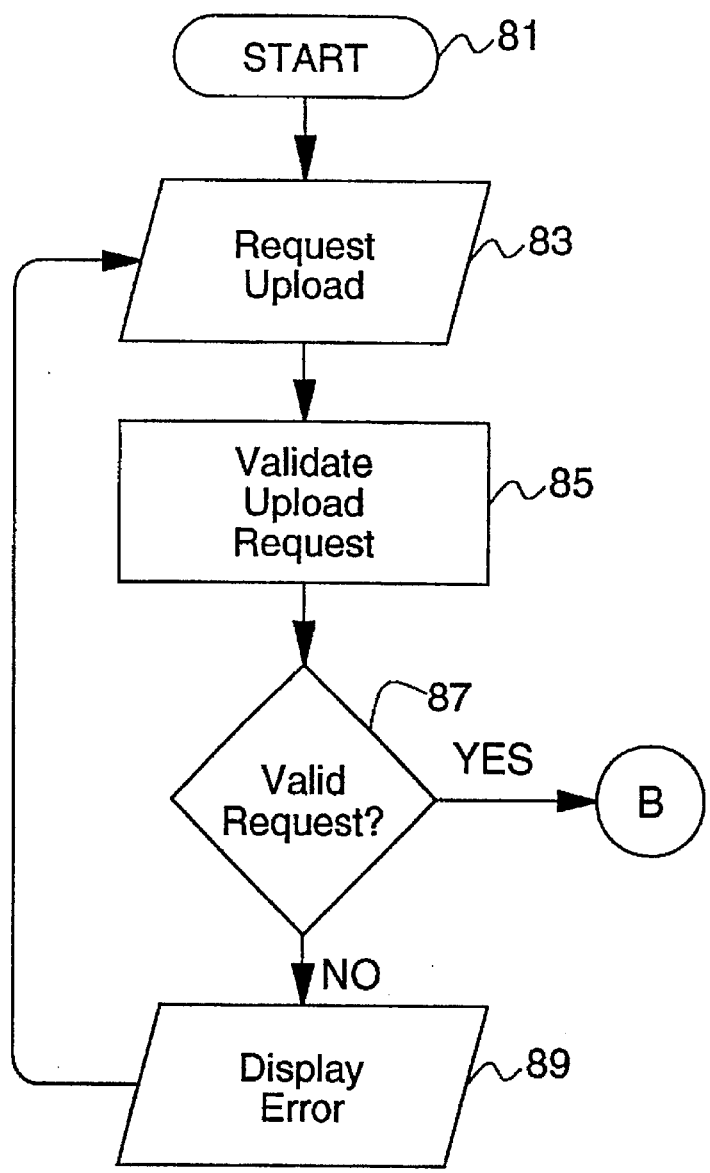
FIGS. 5a, 5b and 6a, 6b are flow charts showing the file transfer aspect between the workstation and the host computer.
Figure 5B:
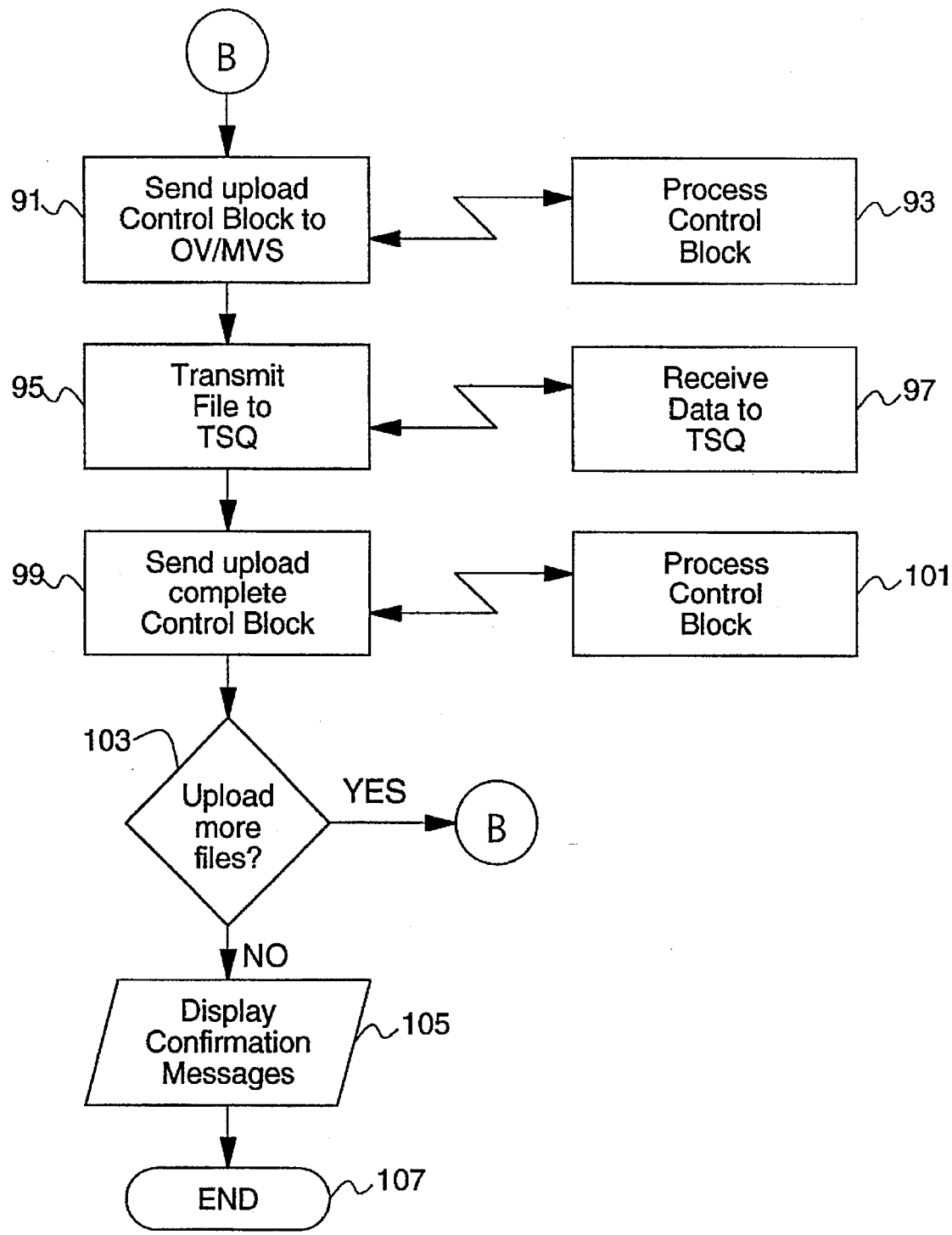
Figure 6A:
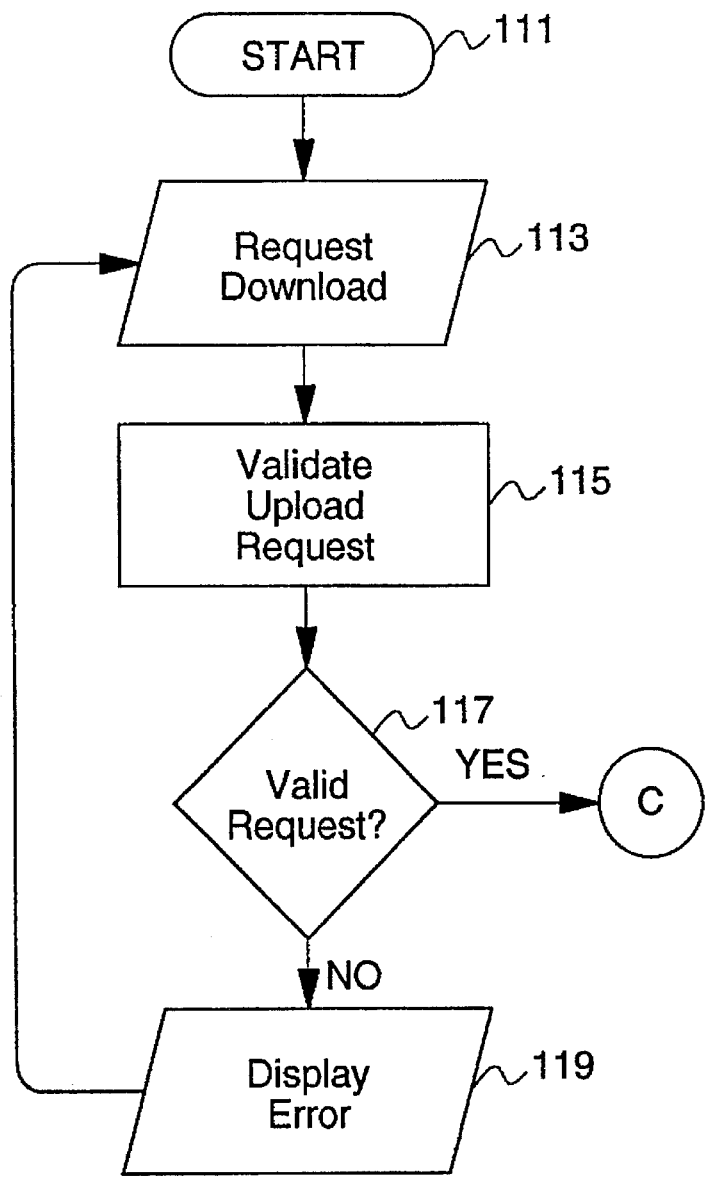
Figure 6B:
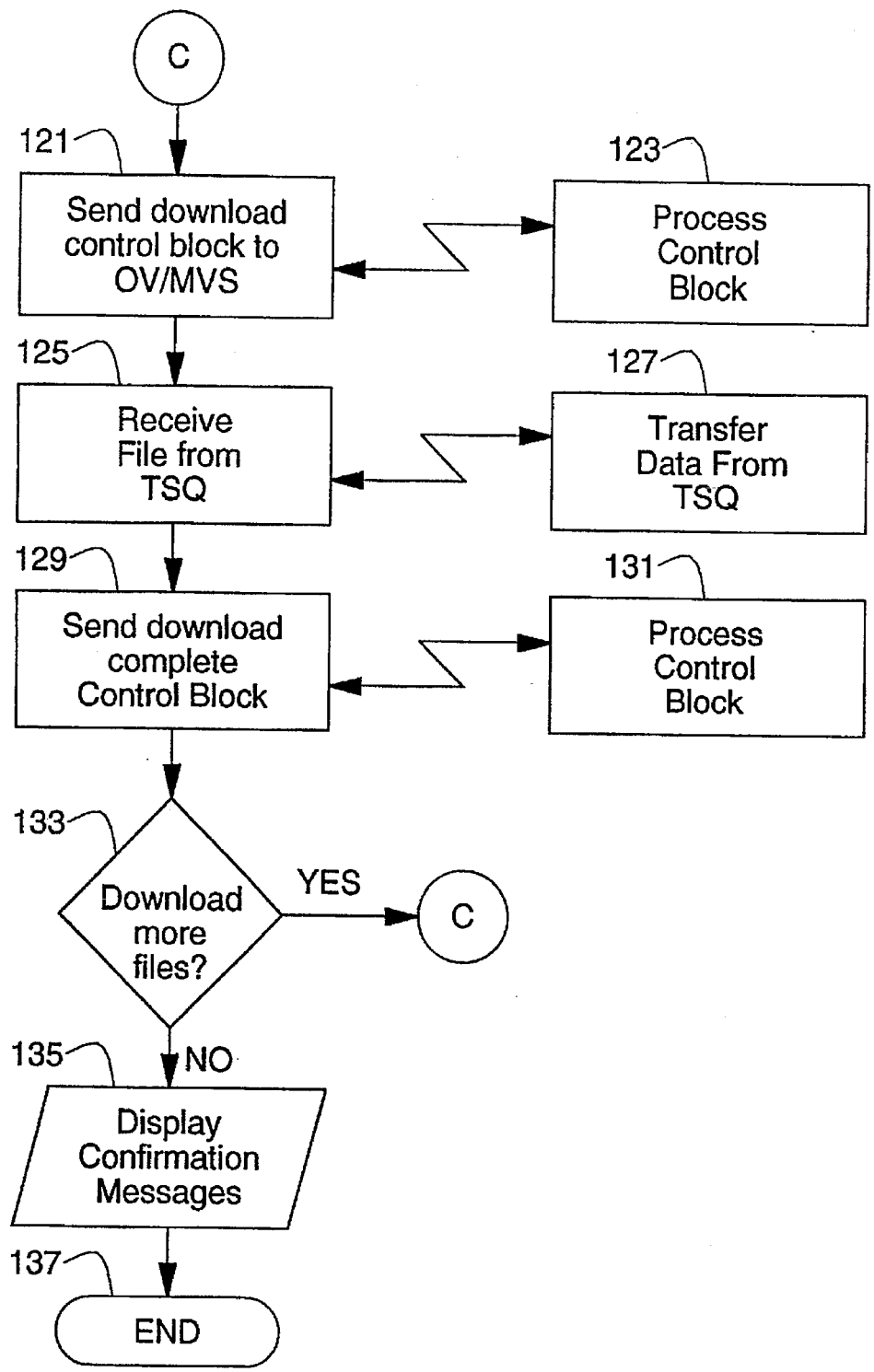
Figure 7A:
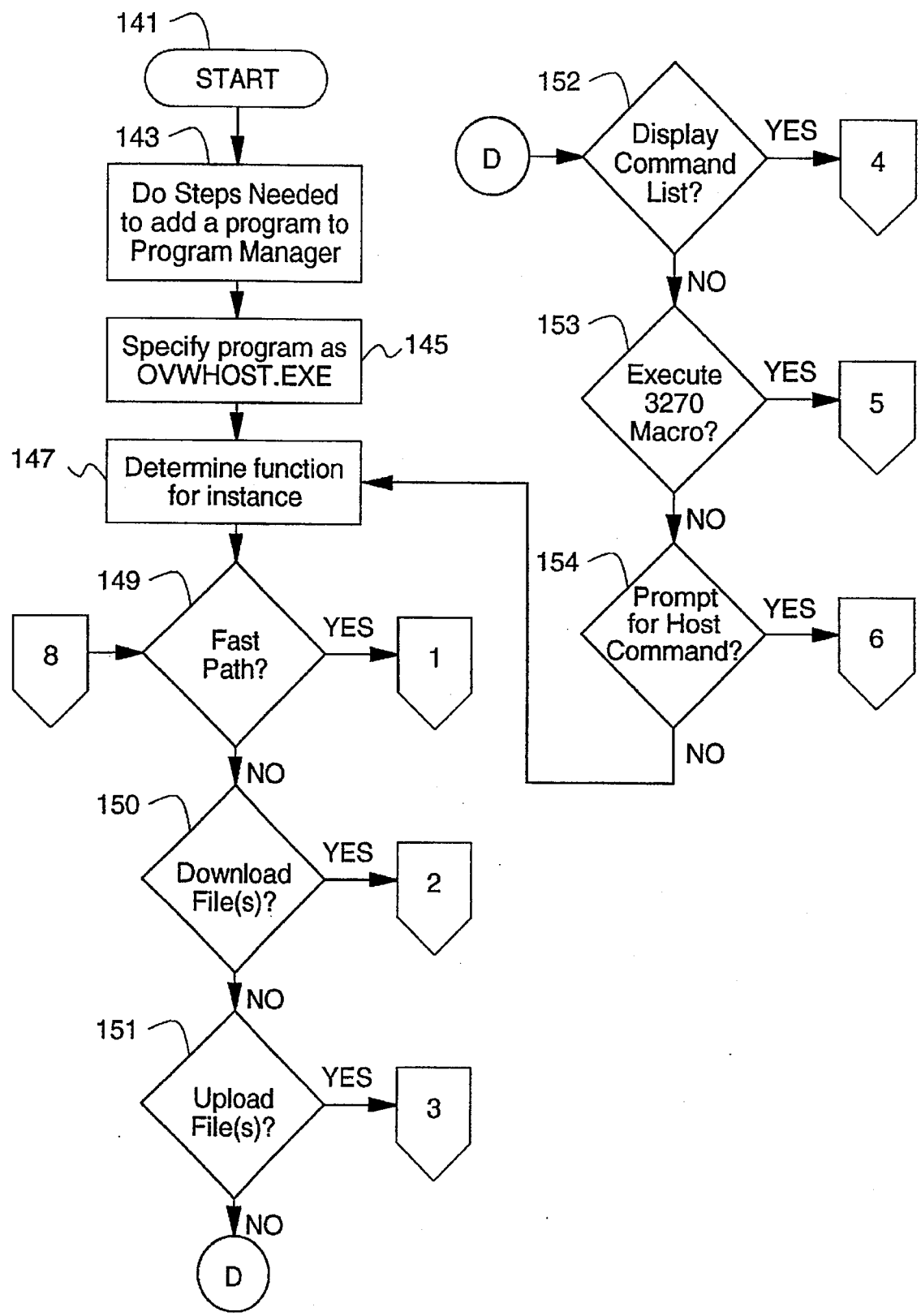
FIGS. 7a–7f are flow charts showing the method of programming icons.
Figure 7B:
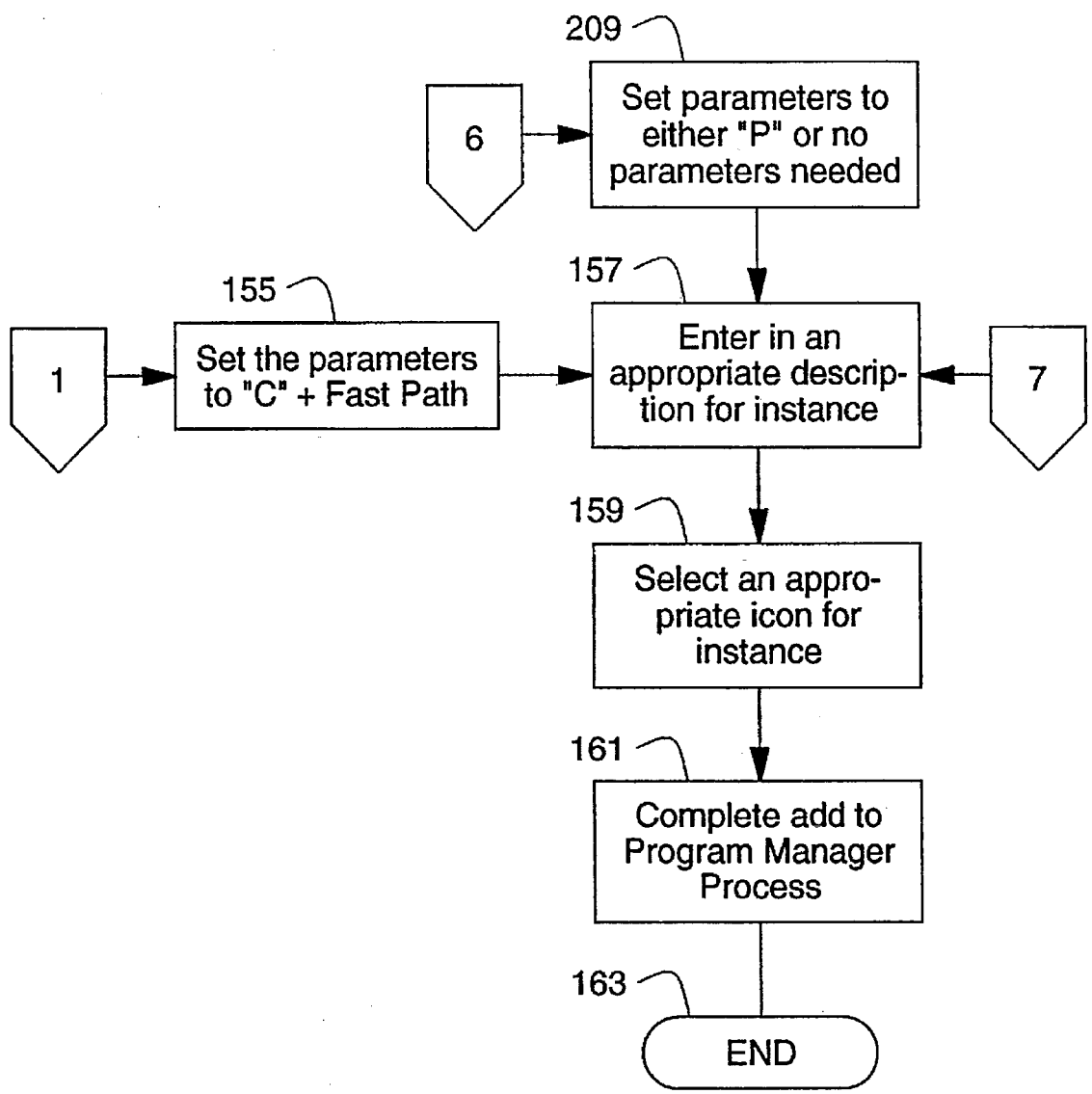
Figure 7C:
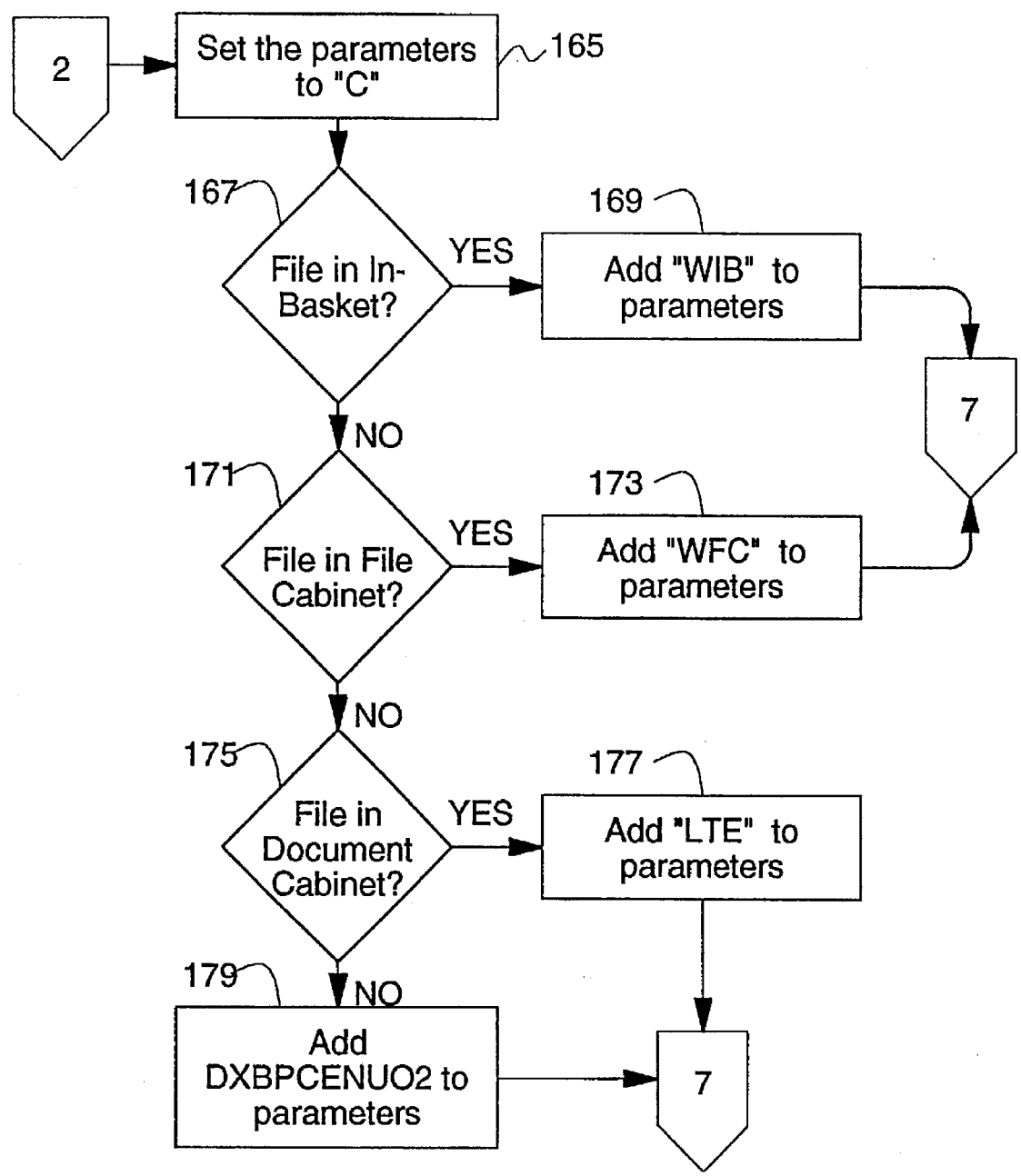
Figure 7D:
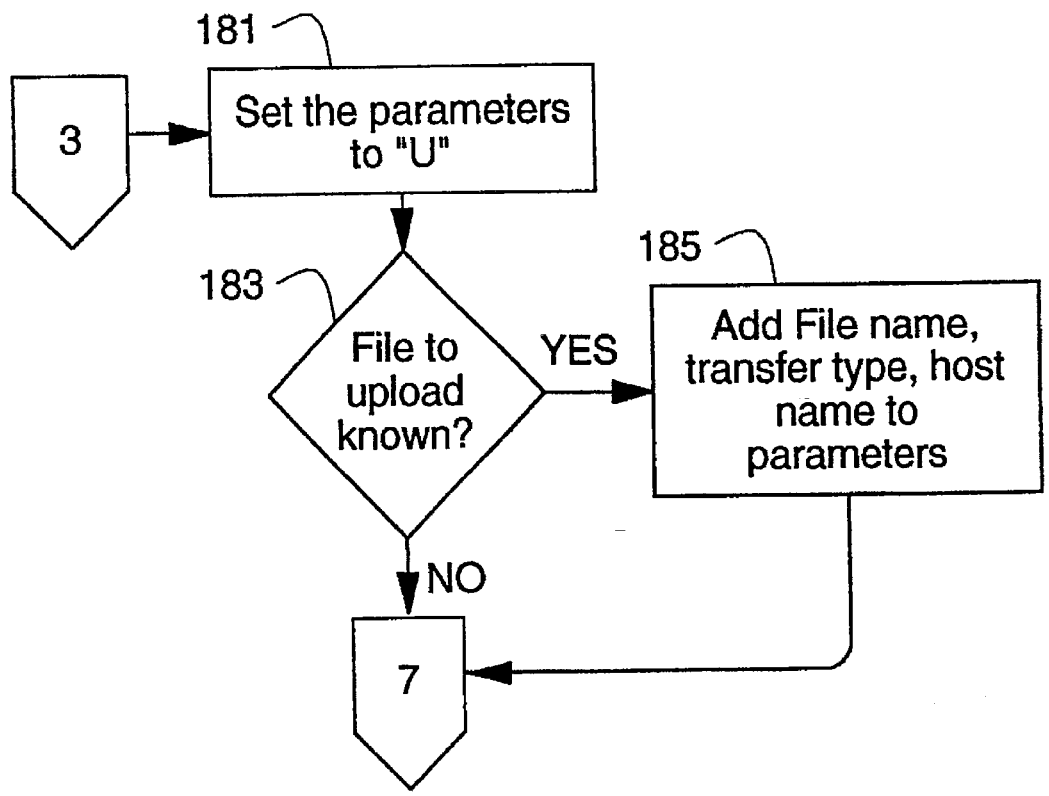
Figure 7E:
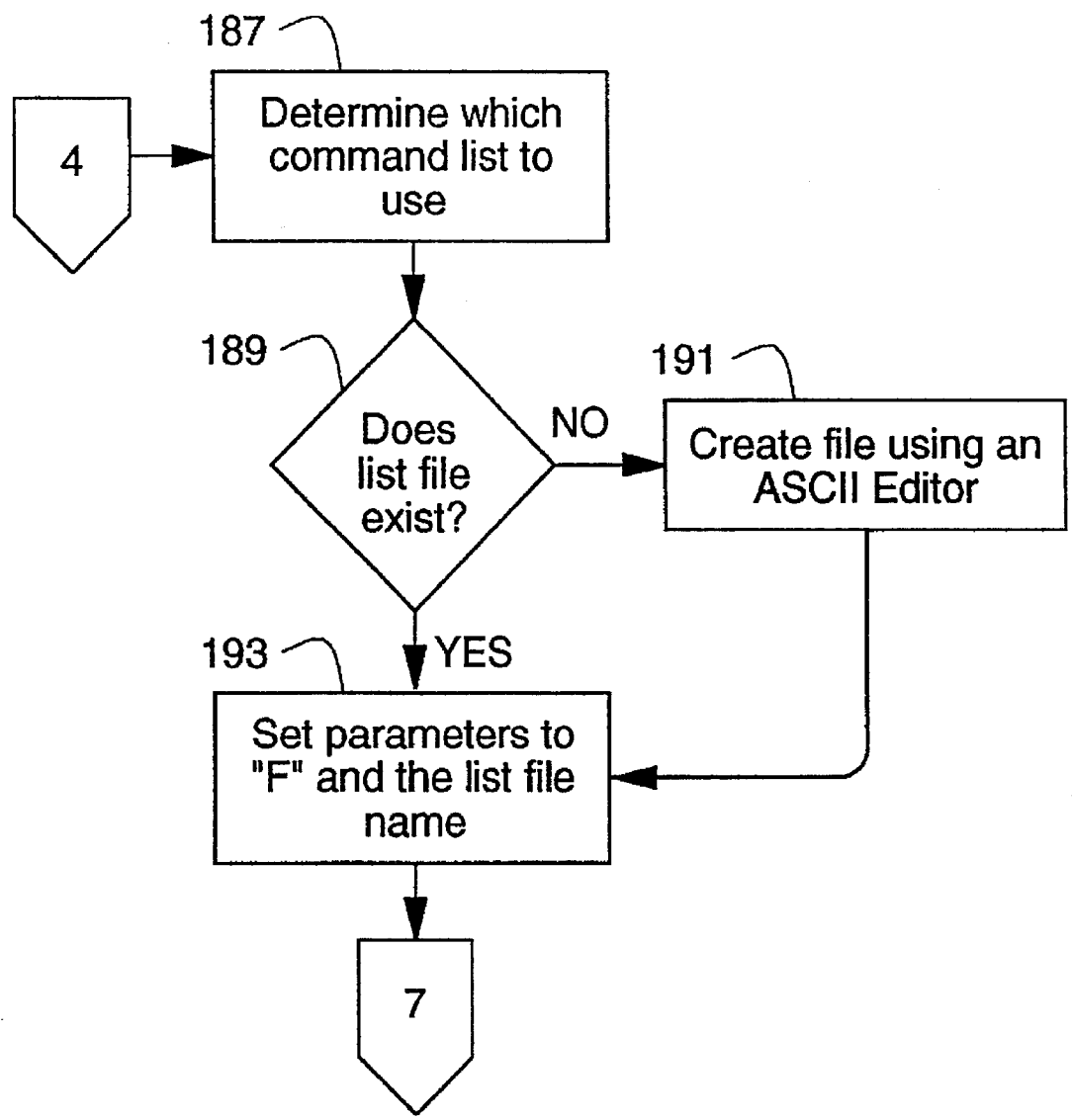
Figure 7F:
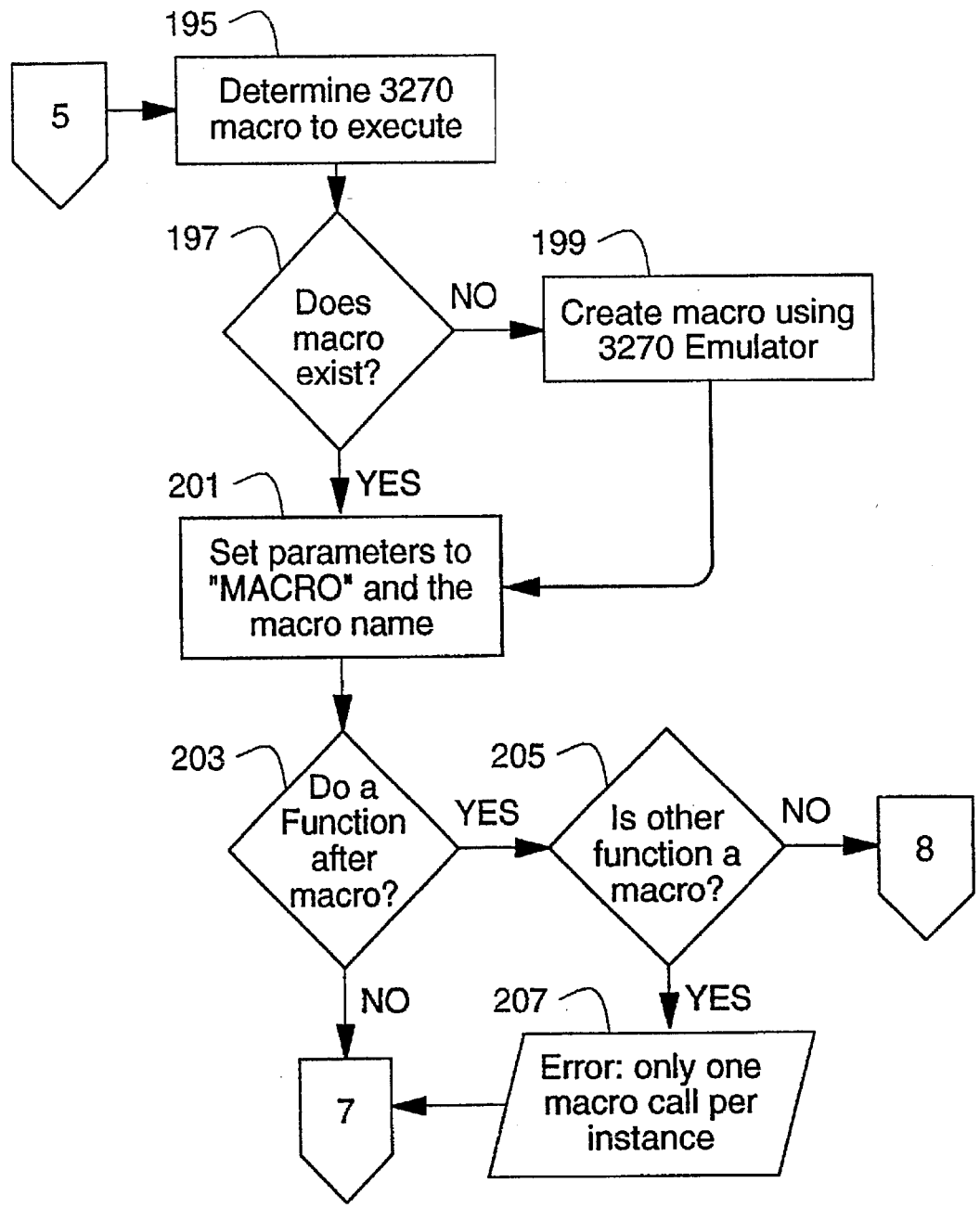

Another aspect of the present invention involves a transfer of files between the workstation 13 and the host 25. This aspect will be described with reference to FIGS. 5 and 6. The flow chart of FIGS. 5a and 5b shows a method for uploading files from the workstation to the host. The flow chart of FIGS. 6a and 6b shows the method for downloading files from the host to the workstation.

The method of uploading files will be discussed first. The method is started, step 81, when invoked by the user. Invocation by the user could involve, for example, selection of the "Upload Files" icon from the window 37 of FIG. 3. In step 83, the user requests to upload a specific file or files. In step 85, the method validates the upload request by determining if the selected file exists. The method then determines if the request is valid, step 87. If the result of step 87 is NO, then the method displays an error, step 89, and returns to step 83.

If the result of step 87 is YES, then the method sends an upload control block to the host 25 program OV/MVS, step 91. The control block informs the host that the workstation 13 is going to send a file. The control block is sent over the communications link 27. In step 93, the host 25 processes the control block.

At the workstation, the method transmits the selected file to a temporary storage queue (TSQ) in the host, step 95. The TSQ is a buffer located in the host. In step 97, the host receives the file data into the TSQ.

At the workstation, after the file has been transmitted, the method sends an upload complete control block to the host, step 99. This informs the host that the upload operation has been completed. In step 101, the host processes the control block.

At the workstation, the method determines if any additional files are to be uploaded, step 103. If YES, then the method returns to step 91 to upload. If NO, then the confirmation messages are displayed on the screen 17, step 105, and the method ends, step 107.

The method of downloading files will now be discussed with reference to FIGS. 6a and 6b. The method is started, step 111, when invoked by the user. Invocation by the user could involve, for example, selection of the "Download Files" icon from the window 37 of FIG. 3. In step 113, the user requests to download a specific file or files. In step 115, the method validates the download request by determining if the selected file exists. The method then determines if the request is valid, step 117. If the result of step 117 is NO, then the method displays an error, step 119, and returns to step 113.

If the result of step 117 is YES, then the method sends a download control block to the host program OV/MVS, step 121. The control block informs the host that the workstation is ready to receive a specified file. The control block is sent over the communications link 27. In step 123, the host processes the control block.

In step 125, the host transmits the file from its TSQ to the workstation over the communications link 127. In step 127, the workstation receives the file from the TSQ. When all of the file has been sent, the host informs the workstation.

At the workstation, the method sends a download complete control block to the host, step 129. This informs the host that the download operation has been completed. In step 131, the host processes the control block.

At the workstation, the method determines if any additional files are to be downloaded, step 133. If YES, then the method returns to step 121 to upload. If NO, then confirmation messages are displayed on the screen 17, step 135, and the method ends, step 137.

Another aspect of MOWS involves programming an icon, as will be explained with reference to FIGS. 7a–7f. The icon programming method is started, step 141 and the user performs the steps that are needed to add a program to the Program Manager window (which is provided by the windows interface running on the workstation), step 143. For example, the user would select the File action from the action bar of the Program Manager window and then select the New option from the pull down menu under File. In step 145, the desired host program is specified. The new icon will be associated with this host program. In the preferred embodiment, the host program is OVWHOST.EXE. In step 147, the user determines the desired function for the desired instance. For example, the user could create a "Get Mail" icon that would take the user to the in basket on the host.

In steps 149–154, the method determines what type of function has been specified, that is whether the function is a fast path (a host command), step 149, to download files to the workstation, step 150, to upload files to the host, step 151, to display a command list, step 152, to execute a 3270 macro, step 153, or to prompt for a host command, step 154.

If the function is a fast path, then the result of step 149 is YES, and the method proceeds to step 155, (FIG. 7b) wherein the parameters are set to "C" and fast path. "C" is a parameter that the host OV/MVS program looks at to determine if the function is for an upload, a download or a macro. Next, in step 157, the user enters an appropriate description for the instance. For example, the user types in a title or a text that will appear below the icon, such as "Get Mail". Then, the user selects the desired icon for the instance, step 159. For example, the user could select an envelope for "Get Mail". Some windows type of interfaces come with a list of icon designs that the user can choose from. In addition, there are commercially available programs that allow the user to design an icon. In step 161, the user completes the addition to the Program Manager by clicking on the OK pushbutton. The method then ends, step 163. The icon for executing the host function will appear on the window of the Program Manager. Another instance for the same function could be created by providing another icon and accompanying text. This would be performed by repeating steps 143 et seq. Of course, the method can be repeated to provide another function with an icon and accompanying text.

If the function is for downloading files, then the result of step 149 is NO and the result of step 150 is YES. Because the function is not a host command, some additional information in the form of parameters must be provided and associated with the icon. In step 165 (FIG. 7c), the parameters are set to "C". In step 167, the method determines if the file is in the In Basket. If YES, then "WIB" (.Work With In Basket) is added to the parameter list, step 169, and the method proceeds to step 157. If the result of step 167 is NO, then the method determines if the file is in the File Cabinet. If YES, then "WFC" (Work With File Cabinet) is added to the list of parameters, step 173 and the method proceeds to step 157. If the result of step 171 is NO, then the method determines if the file is in the Document Cabinet, step 75. The Document Cabinet typically contains items such as manuals and generic form letters, as opposed to the more user specific documents found in In Baskets and File Cabinets. If YES, then "LTE" (List Table Entry) is added to the list of parameters, step 177 and the method proceeds to step 157. If the result of step 175 is NO, then the method proceeds to step 179. Typically, a file is downloaded from one of three sources on the host: the In Basket, the File Cabinet, or the Document Cabinet. If the source is not one of these or the user is unsure, then "DXBPCENU02" is added to the list of parameters, step 179. The method proceeds to step 157.

If the function is for uploading files from the workstation to the host, then the result of step 150 is NO and the result of step 151 is YES. The method then proceeds to step 181 (FIG. 7d), wherein "U" (for upload) is added to the parameter list. In step 183, the method determines if the file to be uploaded is known. If YES, then in step 185, the method adds the file name, the transfer type (ASCII or binary) and host file name to the list of parameters. The method then proceeds to step 157. If the result of step 183 is NO, then the method proceeds to step 157.

If the function is to display a command list, then the result of step 151 is NO and the result of step 152 is YES. The method then proceeds to step 187 (FIG. 7e) to determine which command list is to be used. In step 189, the method determines if the list file exists. If NO, then the file is created using an ASCII editor, step 191. In step 193, "F" (for file list for whatever it may be saved under on the workstation) is added to the parameter list. If the result of step 189 is YES, then the method proceeds to step 193. After step 193, the method proceeds to step 157.

If the function is to execute a 3270 (host) macro, then the result of step 152 is NO and the result of step 153 is YES. The macro need not contain OV/MVS commands, but may contain host commands. The method then proceeds to step 195 (FIG. 7f) to determine which macro is to be executed. For example, the macro could be log on or log off. In step 197, the method determines if the macro exists. If NO, then in step 199, the macro is created with a 3270 emulator. Then, "Macro" and the macro name is added to the parameter list, step 201. If the result of step 197 is YES, step 199 is bypassed and the method proceeds to step 201. After step 201, the method determines if another function after the macro is to be performed, step 203. If NO, then the method proceeds to step 157. If the result of step 203 is YES, then the method determines if the other function is a macro, step 205. If NO, then the method proceeds to step 149 to determine the type of function. If the result of step 205 is YES, then an error message is displayed, step 207, because only one macro call per instance is allowed. The method then proceeds to step 157.

If it is uncertain what type of function has been specified, then the method determines in step 154 if a host command has been selected. If YES, then the method proceeds to step 209 (FIG. 7b) to set the parameters to either "P" for prompt or to have no setting. The method then proceeds to step 157.

If the result of step 154 is NO, then the method returns to step 147 to select a new function.

Figure 8:
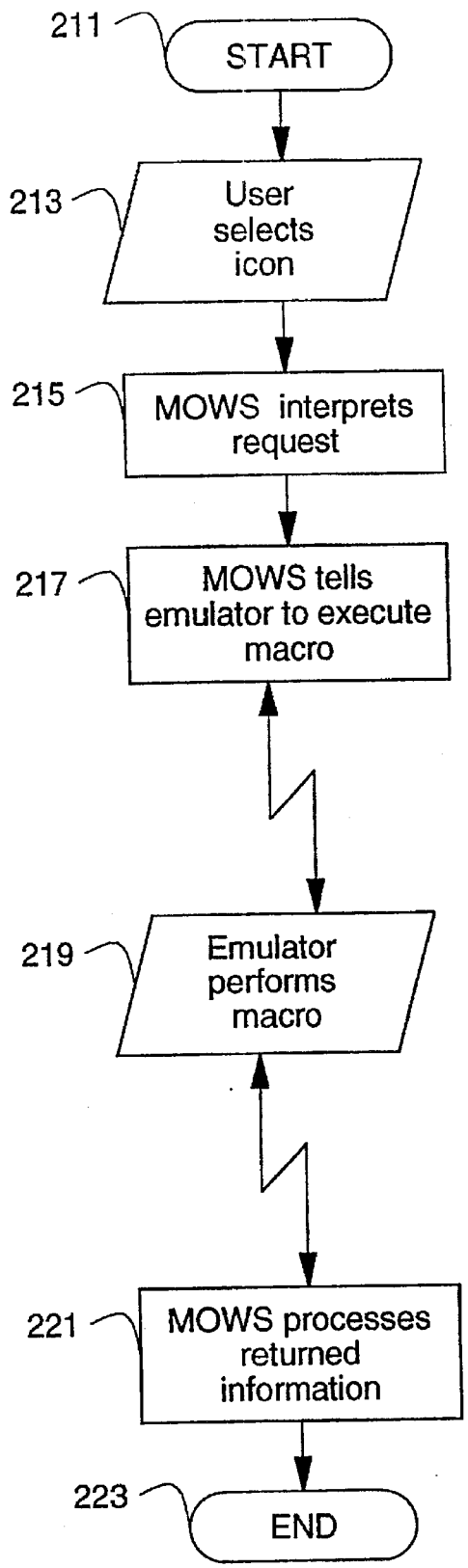
FIG. 8 is a flow chart showing the execution of macros.

Another aspect of MOWS involves execution of a macro. Referring to FIG. 8, the method is started, step 211. In step 213, the user selects an icon that is associated with a macro. Such an icon can be programmed with a macro as described in FIGS. 7a–7f. In step 215, MOWS interprets the request and in step 217, MOWS informs the emulator 31 to execute the macro. In step 219, the emulator performs the macro and in step 221, MOWS processes the return information. In step 223, the method ends.

The foregoing disclosure and the showings made in the drawings are merely illustrative of the principles of this invention and are not to be interpreted in a limiting sense.

I claim:

1. A method of programming an icon for display on a workstation that is in communication with a host data processing system, said host having plural types of functions, comprising the steps of:

a) determining a host function that is to be associated with an icon;

b) automatically determining the type of function said determined host function is;

c) automatically specifying parameters for said function, according to said determined function type, said parameters enabling the execution of said function by said host;

d) associating an icon with said function.

2. The method of claim 1 further comprising the steps of:

a) said step of determining a host function further comprises the step of providing a macro for said host function, wherein said step of associating an icon with said function further comprises associating said icon with said macro;

b) determining when said icon associated with said macro is selected on said workstation;

c) executing said macro on said host data processing system when said icon is selected.

3. The method of claim 1, wherein said step of determining the type of function said determined host function is further comprises the step of determining if said determined host function is a host command.

4. The method of claim 1, wherein said step of determining the type of function said determined host function is further comprises the step of determining if said determined host function is to display a list of host commands.

5. A system for programming an icon for display on a workstation that is in communication with a host data processing system, said host having plural types of functions, comprising:

a) means for determining a host function that is to be associated with an icon;

b) means for automatically determining the type of function said determined host function is;

c) means for automatically specifying parameters for said function according to said determined function type, said parameters enabling the execution of said function by said host;

d) means for associating an icon with said function.

6. The system of claim 5 further comprising:
a) said means for determining a host function further comprises means for providing a macro for said host function, wherein said means for associating an icon with said function further comprises means for associating said icon with said macro;
b) means for determining when said icon associated with said macro is selected on said workstation;
c) means for executing said macro on said host data processing system when said icon is selected.

7. The system of claim 5 wherein said means for automatically determining the type of function said determined host function is further comprises means for determining if said determined host function is a host command.

8. The system of claim 5 wherein said means for automatically determining the type of function said determined host function is further comprises means for determining if said determined host function is to display a list of host commands.

* * * * *

(12) REEXAMINATION CERTIFICATE (4687th)

United States Patent
Roberson

(10) Number: US 5,666,500 C1
(45) Certificate Issued: Dec. 24, 2002

(54) WORKSTATION USER INTERFACE FOR USE IN CONJUNCTION WITH A HOST DATA PROCESSING SYSTEM

(75) Inventor: Kenneth Wayne Roberson, Irving, TX (US)

(73) Assignee: International Business Machines Corporation, Roanoke, TX (US)

Reexamination Request:
No. 90/005,670, Mar. 3, 2000

Reexamination Certificate for:
| | |
|---|---|
| Patent No.: | 5,666,500 |
| Issued: | Sep. 9, 1997 |
| Appl. No.: | 07/996,446 |
| Filed: | Dec. 24, 1992 |

(51) Int. Cl.⁷ ................................................. G06F 3/00
(52) U.S. Cl. ....................................... 345/826; 345/847
(58) Field of Search ................................. 345/333, 329, 345/356, 357, 825–826, 744–747, 835–839, 846–847; 707/10; 395/700, 735, 739, 748, 749, 752, 804

(56) References Cited

U.S. PATENT DOCUMENTS 5,113,517 A * 5/1992 Beard et al. ................. 345/767
5,280,583 A * 1/1994 Nakayame et al. ......... 345/767
5,371,851 A * 12/1994 Pieper et al. ................ 345/763

OTHER PUBLICATIONS

Mitem Corporation, *Mitem Mail: Delivers The Information You Need*, San Jose, CA., pp 1–2, 1990.*
Mitem Corporation, *Mitem Mail User Guide* p. 1–25, Sep. 1990.*
MacPROFF User Guide, Version 2.0: Mariette Systems Int. May 1, 1991, U.S.A.
Letter from Boston: Multifinder and HyperCard receive an enthusiastic reception. (Ideas and Trends); Kay, Emily; Oct. 1987 Lotus, v3, n10, p16 (3); ISSN: 8756–7334.
"MitemMail User Guide", Mitem Corporation, Sep. 21, 1990.

* cited by examiner

*Primary Examiner*—Steven Sax

(57) ABSTRACT

A user interface is provided for a workstation when the workstation is using a host data processing system. The interface provides a windows type of graphical interface on the workstation when using a host program. The interface allows point-and-go access to host program functions with a mouse. Icons represent desired host functions. The interface provides audio notification of incoming mail, allows files to be uploaded and downloaded between the workstation to the host, allows a user to program an icon and executes host macros.

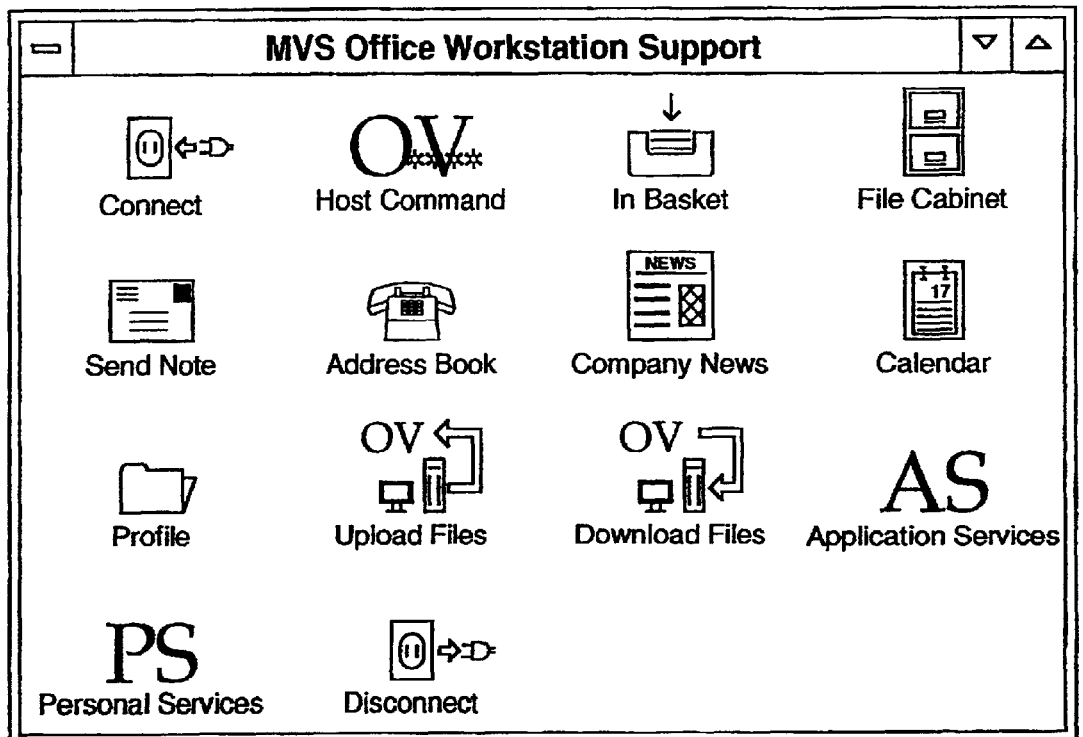

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–8 are determined to be patentable as amended.

New claims 9 and 10 are added and determined to be patentable.

1. A method [of] *for user* programming *of* an icon for display on a workstation that is in communication with a host data processing system, said host having plural types of functions, comprising the steps of:
   a) determining a host function that is to be associated with [an] *a user selected* icon *in response to user selection of a desired function*;
   b) automatically determining [the] *a* type of function *of* said determined host function [is];
   c) automatically specifying parameters for said *determined host* function, according to said determined function type, said parameters enabling the execution of said *determined host* function by said host;
   d) associating [an] *said user selected* icon with said *determined host* function.

2. The method of claim 1 further comprising the steps of:
   a) said step of determining a host function *in response to user selection of a desired function* further comprises the step of providing a macro for said host function, wherein said step of associating [an] *said user selected* icon with said *determined host* function further comprises associating said *user selected* icon with said macro;
   b) determining when said *user selected* icon associated with said macro is selected on said workstation *to invoke said determined host function*; and
   c) executing said macro on said host data processing system when said *user selected* icon is selected *to invoke said determined host function*.

3. The method of claim 1, wherein said step of determining [the] *a* type of function *of* said determined host function [is] further comprises the step of determining if said determined host function is a host command.

4. The method of claim 1, wherein said step of determining [the] *a* type of function *of* said determined host function [is] further comprises the step of determining if said determined host function is to display a list of host commands.

5. A system for *user* programming [an] *of a user selected* icon for display on a workstation that is in communication with a host data processing system, said host having plural types of functions, comprising:
   a) means for determining a host function that is to be associated with [an] *a user selected* icon *in response to user selection of a desired function*;
   b) means for automatically determining [the] *a* type of function *of* said determined host function [is];
   c) means for automatically specifying parameters for said *determined host* function according to said determined function type, said parameters enabling the execution of said *determined host* function by said host;
   d) means for associating [an] *said user selected* icon with said *determined host* function.

6. The system of claim 5 further comprising:
   a) said means for determining a host function further comprises means for providing a macro for said host function, wherein said means for associating [an] *said user selected* icon with said *determined host* function further comprises means for associating said *user selected* icon with said macro;
   b) means for determining when said icon associated with said macro is selected on said workstation *to invoke said determined host function*;
   c) means for executing said macro on said host data processing system when said *user selected* icon is selected *to invoke said determined host function*.

7. The system of claim 5 wherein said means for automatically determining [the] *a* type of function *of* said determined host function [is] further comprises means for determining if said determined host function is a host command.

8. The system of claim 5 wherein said means for automatically determining [the] *a* type of function *of* said determined host function [is] further comprises means for determining if said determined host function is to display a list of host commands.

*9. The method of claim 1 wherein the step of determining a host function that is to be associated with a user selected icon in response to user selection of a desired function further comprises one of the steps of selecting a user selected icon from a plurality of icon designs and designing a user selected icon.*

*10. The system of claim 5 wherein said further means for determining a host function that is to be associated with a user selected icon in response to user selection of a desired function further comprises one of a means for selecting a user selected icon from a plurality of icon designs and means for designing a user selected icon.*

\* \* \* \* \*